United States Patent [19]
Veronesi et al.

[11] Patent Number: 4,756,877
[45] Date of Patent: Jul. 12, 1988

[54] CORE BARREL SUPPORT SYSTEM FOR NUCLEAR REACTORS

[75] Inventors: Luciano Veronesi, O'Hara Twp., Allegheny County; Stephen N. Tower, Washington Twp., Westmoreland County, both of Pa.

[73] Assignee: Westinghouse Electric Corp., Pittsburgh, Pa.

[21] Appl. No.: 795,305

[22] Filed: Nov. 6, 1985

[51] Int. Cl.⁴ .................................................. G21C 5/10
[52] U.S. Cl. ..................................... 376/362; 376/302; 376/461; 403/356; 29/525.1
[58] Field of Search ............... 376/178, 362, 452, 459, 376/461, 302; 403/14, 355, 356, 408.1; 29/526 R

[56] References Cited

U.S. PATENT DOCUMENTS

| | | | |
|---|---|---|---|
| 2,986,509 | 5/1961 | Duffy, Jr. | 376/452 |
| 3,554,868 | 1/1971 | Thorp | 376/461 |
| 3,861,004 | 1/1975 | Schenk | 403/408.1 |
| 3,939,038 | 2/1976 | Pernstich | 376/362 |
| 4,232,497 | 11/1980 | Meschnig | 403/14 |
| 4,295,752 | 10/1981 | Lerch | 403/356 |
| 4,461,593 | 7/1984 | Rodseth | 403/14 |

FOREIGN PATENT DOCUMENTS

| | | | |
|---|---|---|---|
| 140662 | 5/1985 | European Pat. Off. | 376/461 |
| 1086054 | 10/1967 | United Kingdom . | |
| 1088606 | 10/1967 | United Kingdom . | |

Primary Examiner—Deborah L. Kyle
Assistant Examiner—Richard L. Klein
Attorney, Agent, or Firm—Daniel C. Abeles

[57] ABSTRACT

A core support system for a core barrel of a nuclear reactor, which core barrel has a bottom core support plate wherein the core support plate has apertures therethrough about the periphery thereof which communicate with recesses in engagement means for the core support plate, and keys inserted into the core support plate apertures and secured thereto with the lower section of the key extending into the recess of the engagement means. The method of installation enables alignment and securement of the core barrel in the pressure vessel without need for an assembler to enter the area between the core barrel support plate and the bottom of the vessel.

8 Claims, 2 Drawing Sheets

CORE BARREL SUPPORT SYSTEM FOR NUCLEAR REACTORS

FIELD OF THE INVENTION

The present invention relates to a core barrel support system for a nuclear reactor, such as a pressurized water reactor, wherein the core support plate is engaged about the periphery thereof, and a method for installation of a core barrel in a pressure vessel of a reactor where alignment and securement of the core barrel are readily achieved.

DESCRIPTION OF THE PRIOR ART

In nuclear reactors, such as pressurized water reactors, the reactor has an upright cylindrical pressure vessel with a hemispherical lower head section and a removable hemispherical head bolted to the upper end of the vessel. A cylindrical core barrel is suspended inside the pressure vessel from a flange extending around the inside of the upper end of the pressure vessel. The barrel includes a bottom core support plate and is positioned within the pressure vessel spaced from the lower head section a substantial distance therefrom.

The upper region of the core barrel contains reactor control rod guide tubes, while the core internals, such as the fuel element assemblies, the fuel element assemblies support grid structure, and the like are contained in the lower region of the core barrel.

As described in the application of R. M. Blaushild and L. Veronesi, Ser. No. 547,294, filed Oct. 28, 1983, and assigned to the assignee of the present invention, the contents of which application are incorporated by reference herein, while the core barrel is primarily supported at its upper end by engagement with the upper end of the pressure vessel, the lower end of the core barrel is also restrained by engagement means so as to provide lateral stability thereof. As described therein, a preferred means for such lateral stability and auxiliary support is the provision of a plurality of engagement means which are secured to the lower end of the pressure vessel and extend radially inwardly from the upper portion of the walls of the hemispherical lower head section. Each of the engagement means have a recess in the upper surface thereof and keys, such as T-shaped keys are secured to the bottom of the core support plate, which keys are designed to fit into the recesses in the engagement means for lateral stability and to align the core barrel within the reactor vessel.

In the conventional assembly of the core barrel within the reactor vessel, the engagement means with recesses are generally welded to the bottom portion of the pressure vessel and keys are bolted and/or welded to the bottom surface of the core support plate. A very precise alignment is required, between the keys and walls of the recesses or keyways, upon assembly of the core barrel into the pressure vessel. Because of the degree of precise alignment required, the core support plate is provided with a manway or access port, usually through the center of the core support plate, with a cover plate therefor, so that an assembler can be lowered through the manway into the area between the core support plate and the bottom wall of the pressure vessel. The assembler, while in that area, can then make measurements to determine the type and number of shims that are needed to be manufactured and then inserted into the keyways to provide the required alignment. At times, the needed shims can be inserted into the recesses only after removal of the core barrel from the pressure vessel, with the shims then placed into the recesses and the core barrel re-inserted into the pressure vessel. This system of alignment is expensive and time consuming and is possible only when the size of the reactor is such that an assembler can be physically lowered through the manway into the area between the core support plate and the bottom wall of the pressure vessel. In small reactors, for example, the pressure vessel may be of a size so small that an assembler cannot be physically located in the area between the core support plate and the bottom wall of the pressure vessel to perform the alignment operations above-described.

It is an object of the present invention to provide a nuclear reactor which has an improved system for aligning the core barrel relative to engagement means for the core support plate.

It is another object of the present invention to provide an improved method for aligning a core barrel of a nuclear reactor in a pressure vessel.

BRIEF SUMMARY OF THE INVENTION

An improved means for aligning and securing a core barrel within a pressure vessel of a nuclear reactor relative to engagement means disposed about the periphery of the core barrel and attached to the wall of the pressure vessel, wherein the core support plate has a plurality of apertures therethrough which communicate with recesses in the engagement means, and a key is inserted into the apertures, the lower section of which extends into the recess of the engagement means, the key being secured in said apertures of the core support plate.

The keys preferably have an upper flanged portion which fits on a shoulder in the core support plate about the aperture, such that the key is secured in place with its upper surface flush with the upper surface of the core support plate and with the flange secured to the core support plate by welding or by bolted connections.

DETAILED DESCRIPTION

Figure 1:
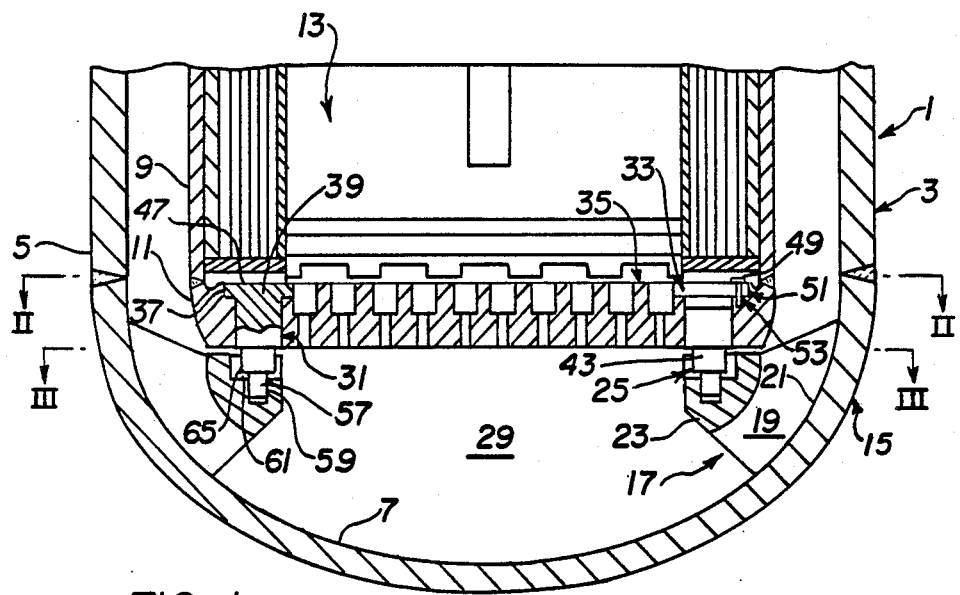
FIG. 1 is a vertical cross-sectonal view of the lower portion of a nuclear reactor pressure vessel showing two engagement means and the core support plate and alignment system of the present invention.
Figure 2:
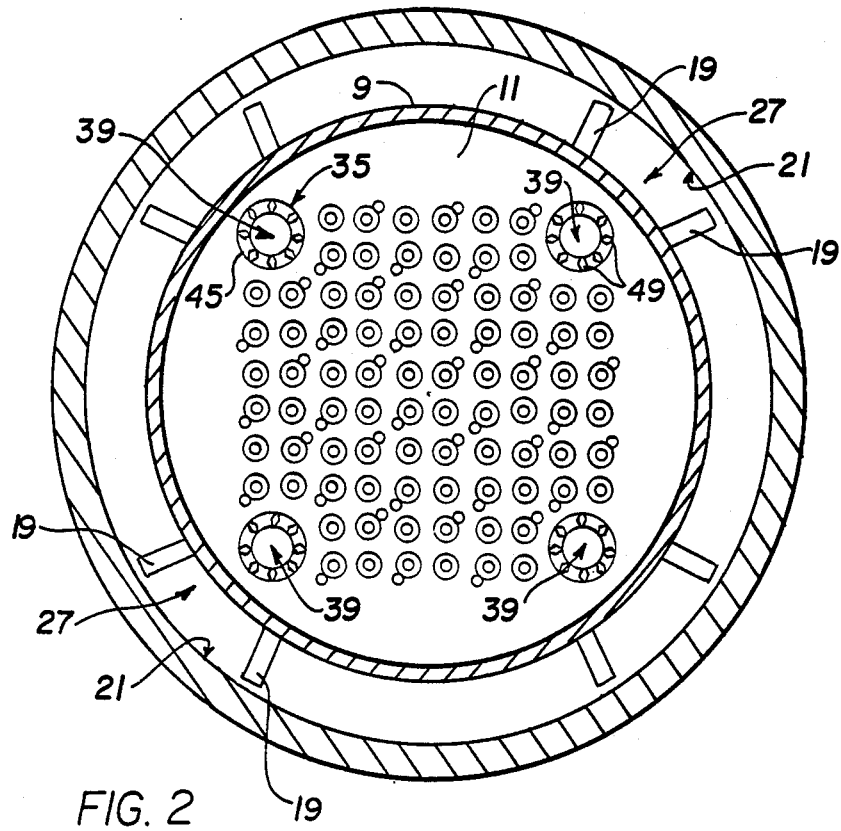
FIG. 2 is a plan view of the core support plate showing four engagement means of the present invention taken along lines II—II of FIG. 1.
Figure 3:
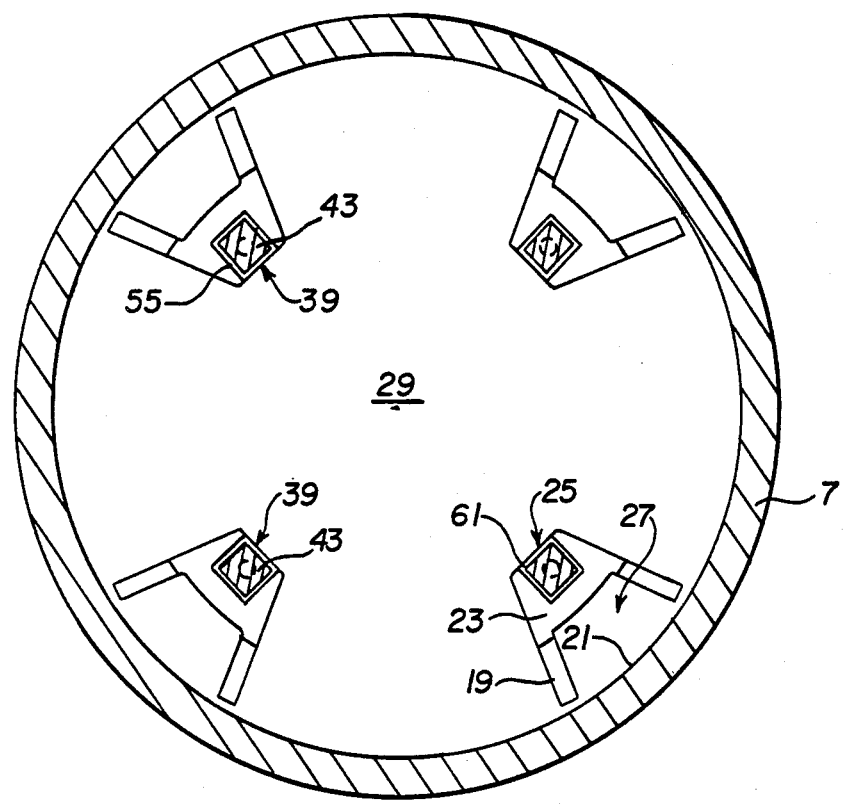
FIG. 3 is a view taken along the lines III—III below the core support plate.

Referring now to the drawings, FIG. 1 illustrates the lower portion of a nuclear reactor 1 which has a substantially cylindrical, vertically oriented pressure vessel 3, the pressure vessel having a vertical wall 5 and hemispherical bottom wall 7. A core barrel 9 is disposed within the pressure vessel 3, the core barrel 9 having a bottom core support plate 11, which supports various components of the reactor constituting the core internals such as the fuel element assemblies, the fuel element assemblies support grid structure, and the like, designated at 13, all as conventionally provided.

The upper section of the core barrel 9 conventionally is provided with an annular, radially outwardly extending flange, not shown, and an upper region of the pressure vessel 3 has an annular, radially inwardly extending ledge, also not shown, upon which the core barrel flange is seated.

Spaced about the upper wall portion 15 of the hemispherical bottom wall 7 are a plurality of engagement means 17, four such engagement means being shown in the drawings, although the number thereof may vary dependent upon the size and type of reactor. The engagement means 17 preferably have a vertical flow channel therethrough and is also preferably formed as a pair of brackets 19 that are attached to the inner wall surface 21 of the upper wall portion 15 of the hemispherical bottom wall 7, and extend radially inwardly therefrom, and a cross-bar or connecting portion 23 having a recess 25 therein, with a flow channel 27 formed between the wall surface 21, brackets 19 and connecting portion 23. The core support plate 11 is thus engaged about its periphery by a plurality of engagement means.

In accordance with the present invention, the core support plate 11 is aligned and secured on the engagement means 17 within the pressure vessel 3 without the need for the entry of personnel into the area 29 between the core support plate 11 and the hemispherical bottom wall 7 of the pressure vessel.

The core support plate 11 is provided with a plurality of apertures 31, preferably having a circular wall, which extend vertically therethrough, about the peripheral region thereof, also preferably with a countersunk portion 33 adjacent the upper surface 35 of the core support plate 11 which forms an annular shoulder 37. An aperture 31 is provided in the core support plate 11 for alignment with each of the engagement means 17, above the recess 25 of the engagement means.

Figures 4, 5:
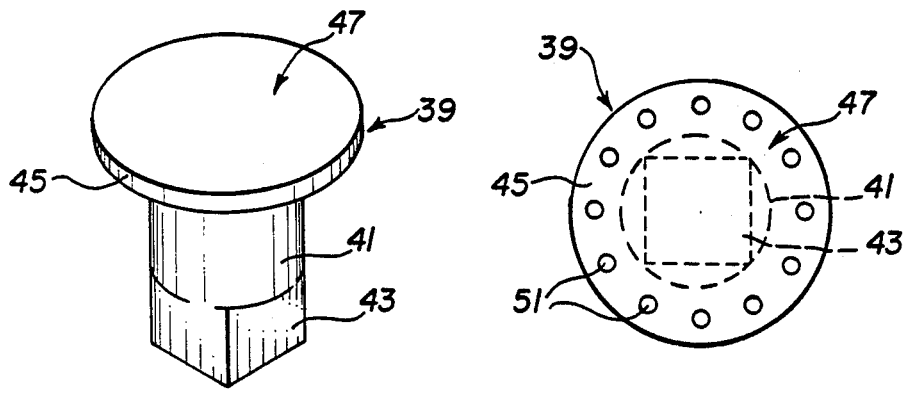
FIG. 4 is a perspective view of a key formed according to the present invention having a cylindrical upper section and rectangular lower section.
FIG. 5 is a top plan view of the key illustrated in FIG. 4, with bores formed in the flange.

To align and affix the core support plate 11 to the engagement means 17, key members 39 are provided, an embodiment of which is illustrated in FIGS. 4 and 5. With the use of apertures 31 having a circular wall thereabout, the key member has a cylindrical upper section 41, a lower non-cylindrical, and preferably rectangular section 43, and a top outwardly radial flange section 45, the upper surface 47 of which is flat.

As illustrated, the keys 39 are secured in the apertures 31, with the flanged section 45 fitting within the countersunk portion 33 of the core support plate 11, and the top surface 47 of the key is flush with the top surface 35 of the core support plate 11. The keys are then secured to the core support plate such as by welding or by the use of bolts 49 which extend through bores 51 in the flange 45 that engage in complementary bores 53 in the shoulder 37 formed in the core support plate 11 about the aperture 31. Upon securement, the lower section 43 of the keys 39 extend into and register in the recesses 25 in the engagement means 17 to provide lateral and radial support and alignment.

The lower section 43 of the key 39 is machined so as to provide a mating relationship in the recess 25 of the engagement means, or, if desired, shims 55 may be added to provide such relationship. The provision of collapsible shock absorbers between the core support plate 11 and the engagement means 17 is provided by placement of collapsible cylinders such as stainless steel cylinders, 57 in cavities 59 formed in the surface 61 forming recess 25 and in complementary cavities 63 formed in the bottom wall 65 of the key 39, the cylinders preferably of a mushroom shape.

In the method of installing and aligning a core barrel in a nuclear reactor pressure vessel according to the present invention, a pressure vessel 3 is provided with a plurality of engagement means 17, having recesses 25 therein, about the lower inner wall thereof, i.e., spaced about the inner wall surface 21 of the upper wall portion 15 of the hemispherical bottom wall 7 of the pressure vessel 3. A core support plate 11 of a core barrel 9 is provided with a plurality of apertures 31 therethrough, with an aperture 31 provided for alignment with each of the recesses 25 of the engagement means 17. The core barrrel 9 with its core support plate 11 is inserted into the pressure vessel 3 from the top and the apertures 31 aligned with the recesses 25. The assembler then determines, through the apertures 31, the exact dimensions required for the lower section 43 of each key 39 and the key is machined to the desired tolerances. Where desired, the provision of shims to provide the desired clearance may also be manufactured and inserted. The keys 39 are then inserted from the top, into the apertures 31 with the lower section 43 fitted in the recesses 25. The keys 39 are then secured to the top of the core support plate 11 by welding or by use of bolts 49 with the upper surface 47 of the key 39 being flush with the upper surface 35 of the core support plate 11.

The present invention permits the measurement of the relative position of the keys in the core support plate and the recesses or keyways in the engagement means without physically locating an assembler in the area between the core support plate and the hemispherical bottom wall of the pressure vessel. With the present arrangement, the conventional manway and cover plug of the core support plate can be eliminated. Also, with the present invention, the need to remove the core barrel from the reactor vessel for insertion of custom-made shims in the recesses of the engagement means is not required.

What is claimed is:

1. A nuclear reactor having a pressure vessel and a core barrel having a bottom core support plate situated within the pressure vessel, the core support plate engaged about the periphery thereof by a plurality of engagement means, which have a recess therein for engagement with a key, wherein:

said core support plate has a plurality of apertures therethrough one of which communicates with each recess of said engagement means, wherein a circular wall is provided in said core support plate about said apertures; and a key insertable into and positioned in said apertures in a secure relationship, said key having a lower section thereof of a rectangular cross-section which extends into said recess of said engagement means, said apertures of said core support plate being alignable with said engagement means of said pressure vessel and said keys being securable in said apertures of said core support plate and said recess of said engagement means from above said core support plate.

2. A nuclear reactor having a pressure vessel and a core barrel having a bottom core support plate situated within the pressure vessel, the support plate engaged about the periphery thereof by a plurality of engagement means, which have a recess therein for engagement with a key, wherein:

said core support plate has a plurality of apertures therethrough one of which communicates with each recess of said engagement means and an upper surface with a countersunk shoulder about each aperture;

a key insertable into and positioned in said apertures in a secure relationship, said key having a flange which mates with said shoulder to form a substantially horizontal upper surface on said core support plate after placement of said key, and a lower section thereof which extends into said recess of said engagement means, and fastening means to secure the flange of said key to said shoulder;

said apertures of said core support plate being alignable with said engagement means of said pressure vessel and said keys being securable in said apertures of said core support plate and said recess of said engagement means from above said core support plate.

3. A nuclear reactor as defined in claim 2, wherein the fastening means comprises welding of the flange of said key to the core support plate.

4. A nuclear reactor as defined in claim 2, wherein bores are provided about the periphery of said flange of said key and complementary bores are provided in the shoulder of said core support plate and said fastening means are bolts engaged in said bores.

5. A method of aligning a core support barrel having a core support plate at the bottom thereof in a nuclear reactor pressure vessel comprising:

providing a pressure vessel having a plurality of engagement means about the lower inner wall thereof, the engagement means having a recess in the upper surface thereof;

providing said core support plate with a plurality of apertures therethrough, with circular walls about said apertures, one said aperture provided for alignment with the recess of each said engagement means;

inserting said core barrel into the pressure vessel and initially aligning the apertures of the core support plate with the recesses of said engagement means;

inserting a key having a cylindrical section slidable into said aperture and a non-cylindrical lower section into each aperture of the core support plate such that a lower section thereof extends into said recess;

altering the lower section of the key to provide mating relationship between said lower section thereof and the recess;

securing said keys in said core support plate with the lower section thereof mating with the recess of said engagements, and said apertures of said core support plate being aligned with said engagement means of said pressure vessel and said keys secured in said apertures of said core support plate and said recess of said engagement means from above said core support plate.

6. The method of claim 5 wherein a core support plate is provided having a countersunk portion forming a shoulder about the apertures and said keys having a flange seatable on said shoulder whereby the top of the key is flush with the top surface of the core support plate upon insertion into said aperture.

7. The method of claim 6 wherein said securing is by welding of the flange of said key to the core support plate.

8. The method of claim 6 wherein said securing is by bolting the flange of said key to said core support plate.

* * * * *